Aug. 17, 1965

R. G. HEDGES 3,200,505

PROTRACTOR GUIDE FOR BENDING PIPES

Filed June 7, 1963

INVENTOR
Ralph Gordon Hedges

United States Patent Office 3,200,505
Patented Aug. 17, 1965

3,200,505
PROTRACTOR GUIDE FOR BENDING PIPES
Ralph G. Hedges, R.R. 1, Floyd, Iowa
Filed June 7, 1963, Ser. No. 286,275
3 Claims. (Cl. 33—180)

This invention relates to protractor guides and, more particularly, to a protractor guide for bending pipes to close dimensions, and for matching the bend of pipes already installed.

It is an object of the present invention to provide a manually adjustable protractor guide which can be sequentially set to bend a section of pipe through a sequential bending operation.

Another object of the present invention is to provide a pipe bending protractor of the type described which will insure the proper bending angle of a section of pipe during each incremental bending step, so as to insure the proper radius of curvature throughout the entire bend without damage to the pipe wall.

Another object of the present invention is to provide a protractor guide of the aforementioned type which can be used to measure the bend of pipes already installed for matching or replacement purposes.

All of the foregoing and still further objects and advantages of this invention will become apparent from a study of the following specification, taken in connection with the accompanying drawing, wherein.

Figure 1:
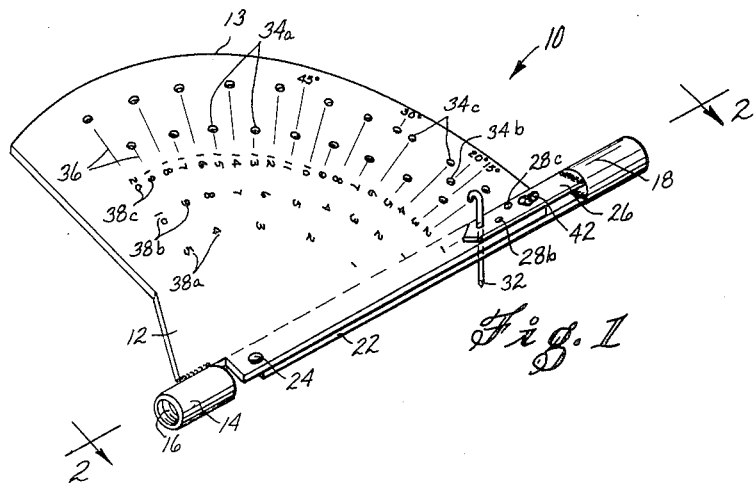
FIGURE 1 is a perspective view of a protractor guide for bending pipes made in accordance with the present invention.
Figure 2:
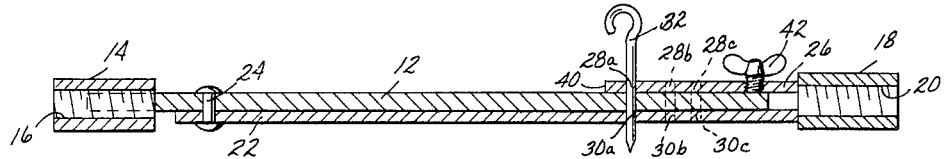
FIGURE 2 is an enlarged fragmentary cross sectional view taken along line 2—2 of FIGURE 1.
Figure 3:
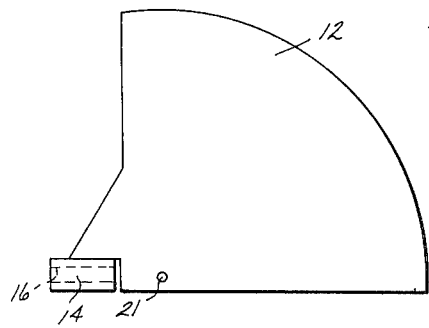
FIGURE 3 is a plan view of a main reference plate forming a part of the present invention.
Figure 4:
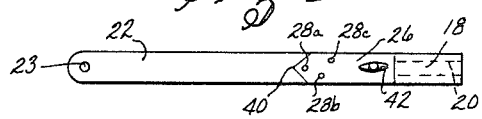
FIGURE 4 is a plan view of a bar member forming another part of the present invention.

Referring now to the drawing, a protractor guide assembly 10 made in accordance with the present invention is shown to include a main reference plate 12 having an alignment pipe fitting 14 secured to one end. The fitting 14 is provided with an internally threaded bore 16 for threadedly receiving an alignment bar therewithin for purposes hereinafter more fully described.

An alignment bar socket 18 having an internally threaded socket 20, is mounted upon one end of an alignment bar 22 having an aperture 23 for receiving a rivet or other pivot type joint 24 carried within an aperture 21 in the main reference plate 12, adjacent the fitting 14. The alignment bar socket 18 is also provided with an indicator plate 26 which is in juxtaposition with the alignment bar 22 so as to slidably receive the adjacent portion of the main reference plate 12 therebetween.

The indicator plate 26 is provided with three apertures 28a, 28b, 28c, which are spaced at different distances from the pivot joint 24. These apertures 28a, 28b, 28c are in alignment with similar apertures 30a, 30b, 30c in the bar 22, and are in further alignment with individual sets of apertures 34a, 34b, 34c, respectively, in the main reference plate 12. The outer surface of the main reference plate 12 is provided with an arcuate periphery 13 which has a radius of curvature centered at the pivot joint 24, so as to accommodate the pivotal movement of the alignment bar 22 relative to the reference plate. A locking pin 32, may thus be inserted selectively through any one of the apertures in the main reference plate by aligning it with the proper aperture in the indicator plate 26.

Figure 5:
FIGURE 5 is a fragmentary plan view of a section of pipe prepared for bending in accordance with the present invention.
Figure 6:
FIGURE 6 is a plan view of the section of pipe shown in FIGURE 5 after the bending operation.

Except for three special apertures indicating an included angle of fifteen degrees, twenty degrees, and thirty degrees, the remaining apertures are sequentially spaced four and one-half degrees apart, thus providing a total of twenty apertures, each of which is provided with a lead line 36 and a sequential reference number. In preparing a section of pipe 44 for bending through any desired angle, the section to be bent is provided with a series of markings 46 equally spaced apart throughout the bend area. Each mark represents the point of pressure application for incrementally bending pipe through the entire bend angle. Thus, if the section of pipe 44 is to be bent through an included angle of ninety degrees in ten steps, the press or other pressure applicator, is sequentially applied to the pipe at each marking 46, to incrementally bend the pipe nine degrees for each of the ten pressure applications. To facilitate each bending step, the main reference plate 12 is provided with three series of indicia 38a, 38b, 38c, which represent a five step, ten step, and twenty step bending operation for a full ninety degree bend. Thus, to bend the section of pipe 44 illustrated in FIGURES 5 and 6 from the straight position to the ninety degree position 44a, the lock pin 32 will be inserted in the appropriate apertures of the alignment bar and indicator plate 26 and the apertures in the reference plate 12, indicated by the indicia 38b for the ten step operation. The indicator plate 26 has an arrow 40 formed at its upper end for alignment with the indicia, as shown in FIGURE 1.

Of course, the angle of bend may vary, and any combination of the apertures may be used. For example, in order to achieve a forty-five degree bend in three steps, the fifteen degree, thirty degree and forty-five degree apertures are sequentially used. A lock type wing bolt 42 threadedly carried by the indicator plate 26, may be used to clamp the alignment bar 22 in any desired position relative to the main reference plates for intermediate angular positions.

To facilitate the alignment of the parts, threaded sections of pipe or alignment bars are threadedly inserted into the fitting 14 and socket 18, to provide means for aligning the apparatus with the opposite ends of the pipe being bent. The alignment bars are also useful in measuring installed pipes to determine the angle of bend for matching or replacement purposes. As the pipe is bent by any suitable apparatus, each bending step is carefully measured by the sequential position of the protractor guide, and the bending pressure is not applied to the next pressure area until the previous bend angle has been accurately set.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A protractor guide for bending pipes comprising, in combination, a main reference plate, an alignment pipe fitting carried by one end of said reference plate, a bar having a pivot joint pivotally connecting one end of said bar to said plate adjacent said fitting, said reference plate having an arcuate peripheral portion with a center of curvature coincident with the axis of rotation of said pivot joint, the opposite end of said bar having an alignment pipe socket mounted thereon for arcuate rotation adjacent said arcuate peripheral portion of said plate, and incremental detent means acting between said bar and said plate for sequentially rotating said bar through a predetermined angle relative to said reference plate.

2. A protractor guide for bending pipes as set forth in claim 1, wherein said bar underlies one surface of said reference plate, and an indicator carried by said socket is in juxtaposition with said bar and overlying an opposite surface of said reference plate, said reference plate being slidably received between said bar and said indicator.

3. A protractor guide for bending pipes as set forth in claim 2, wherein said detent means comprises at least one series of circumferentially spaced apart perforations in said reference plate, said bar and indicator having aligned apertures aligned with said perforations, and a pin slidably received through said apertures and a selected one of said perforations to secure said bar in an adjusted angular position relative to said fitting.

References Cited by the Examiner
UNITED STATES PATENTS 3,060,587   10/62   Picken _____ 33—180

ISAAC LISANN, *Primary Examiner.*